United States Patent
Chen et al.

(10) Patent No.: US 6,335,063 B1
(45) Date of Patent: Jan. 1, 2002

(54) SURFACE TREATMENT OF SUBSTRATES FOR LOW-GLIDE HEIGHT MAGNETO-OPTICAL MEDIA

(75) Inventors: Ga-Lane Chen; Simon Wing-Tat Fung, both of Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/421,393

(22) Filed: Oct. 20, 1999

Related U.S. Application Data
(60) Provisional application No. 60/115,792, filed on Jan. 8, 1999.

(51) Int. Cl.[7] .............................................. B05D 3/06
(52) U.S. Cl. ................... 427/558; 427/129; 427/130; 427/131; 427/132; 427/209; 427/249.1; 427/289; 427/307; 427/316; 427/318; 427/322; 427/327; 427/444; 427/523; 427/577; 427/585; 427/595
(58) Field of Search ................................ 427/128–132, 427/444, 558, 595, 249.1, 307, 523, 318, 577, 316, 585, 322, 327, 289, 209

(56) References Cited

U.S. PATENT DOCUMENTS

| | | | |
|---|---|---|---|
| 5,328,740 A | 7/1994 | Nakayama et al. | |
| 5,373,604 A | 12/1994 | Reuter | |
| 5,427,833 A | 6/1995 | Nakayama et al. | ..................... |

Primary Examiner—Bernard Pianalto
(74) Attorney, Agent, or Firm—McDermott, Will & Emery

(57) ABSTRACT

Very low glide height magneto-optical (LGMO) information storage and retrieval media of near field recording (NFR) and mahnetic super-resolution (MSR) types having improved tribological properties when used in ultra-high density storage/retrieval devices employing very small head flying heights on the order of less than about 2 microinches are formed in a front surface magneto-optical (FSMO) configuration utilizing a substrate having at least one deposition surface subjected to a two-step, synergistic treatment comprising tape burnishing/wiping and photolytic treatment in an ozone-containing atmosphere, followed by deposition thereon of the MO layer stack. Enhanced wear and abrasion resistance at very low flying head heights is provided by an ultra-thin, protective flash layer overcoat (FLO)/lubricant topcoat layer system on the media surface. Embodiments of the present invention include single- and dual-sided MO media.

13 Claims, 4 Drawing Sheets

SURFACE TREATMENT OF SUBSTRATES FOR LOW-GLIDE HEIGHT MAGNETO-OPTICAL MEDIA

CROSS-REFERENCE TO PROVISIONAL APPLICATION

This application claims priority from provisional patent application Serial No. 60/115,792 filed Jan. 8, 1999, the entire disclosure of which is incorporated herein by reference.

FIELD OF THE INVENTION

The present invention relates to the recording, storage, and reading of information utilizing low-glide height, high recording density, magneto-optical ("MO") media, particularly rotatable MO storage media, such as in the form of thin film disks, for use with a cooperating transducer and/or sensor head or similar device. More particularly, the present invention relates to a method for treating the deposition surface(s) of such type MO media for enabling operation at very low glide height. The present invention enjoys particular utility in the manufacture of magnetic super-resolution ("MSR")-type and near field recording ("NFR")-type MO media and hybrids thereof, configured as single- or dual-sided first surface magneto-optical ("FSMO")-type media.

BACKGROUND OF THE INVENTION

In recent years, much research and development of magneto-optical (MO) recording media for use as high density/high capacity memory and data storage and retrieval devices has been carried out. Such media typically comprise a suitable substrate, e.g., of glass, polymer, metal, or ceramic material, coated with a perpendicularly magnetizable film used as a recording medium. Information is recorded within the medium by switching the direction of magnetization of desired portions (i.e., domains) of the perpendicularly magnetizable film. More specifically, for recording information, the recording medium is first initialized by applying to the medium a magnetic field from an externally positioned magnetic field generation device (i.e., external magnetic bias), thereby making the direction of the perpendicular magnetization uniformly upwardly or downwardly facing. A first laser beam of sufficiently high power or intensity from a suitable source, e.g., a laser diode, is then irradiated on desired recording portions of the recording medium in the presence of an externally applied magnetic bias field. As a consequence of the laser beam irradiation, the temperature of the irradiated portions (domains) of the recording medium rises, and when the temperature reaches or exceeds the Curie point of the vertically magnetizable film or its magnetic compensation point, the coercive force on the recording portion becomes zero or substantially zero. When this state is achieved at the desired recording portions of the medium, and in the presence of the externally biased magnetic field, the direction of the perpendicular magnetization is switched, e.g., from upwardly facing (=digital logic 1 or 0) to downwardly facing (=digital logic 0 or 1, respectively) or vice versa, so as to be aligned with that of the external magnetic field. At the end of a write pulse (i.e., laser pulse), the temperature of the heated recording domain then decreases and eventually returns to room temperature by cessation of the laser beam irradiation thereof. Since the alignment direction of magnetization of the recording media effected by the laser pulse heating to above the Curie temperature is maintained at the lowered temperature, desired information can thus be recorded in the magneto-optical media.

For reading the information stored in the MO media according to the above-described method, the recorded portions of the media are irradiated with a second, linearly polarized laser beam of lower power or intensity than the one used for recording, and light reflected or transmitted from the recorded portions is detected, as by a suitable detector/sensor means. The recorded information is read out by detecting the Kerr rotation angle of the polarization plane of light reflected from the recording layer or the Faraday rotation angle of the polarization plane of light transmitted through the recording layer. More particularly, since the rotation angle of the polarization plane varies depending upon the direction of magnetization of the recorded portions of the media according to the Kerr or Faraday effect, information stored within the media can be read out optically by a differential detector which decodes the polarization-modulated light beam into bits of information.

Conventional MO recording technology typically utilizes a transparent substrate and the polarized, lower intensity laser beam is transmitted through the recording medium layers for reception by the detector/sensor means for measurement of the rotation angle of the transmitted polarized light via the Faraday effect, as explained supra. However, in first surface magneto-optical (FSMO) recording systems, polarized, lower intensity laser beam light is reflected from the MO medium for measurement of the amount of rotation of the plane of the polarized laser light via the Kerr effect, again employing a suitable detector/sensor means. The FSMO type system is advantageous in that, inter alia, opaque substrate materials, e.g., polymers, can be utilized, and dual-sided media are readily fabricated. In addition, FSMO-type media can advantageously utilize such less expensive polymeric substrates with a pre-formatted servo pattern easily formed on the surface thereof by a mastering and injection molding process, therefore not requiring electronic servo as in conventional hard disk drive technology.

In addition to the above-mentioned advantages, the direct irradiation of the MO layer(s) of FSMO-configured media via the front side also results in several other advantages vis-a-vis through-the-substrate illumination, e.g., FSMO systems can utilize head sliders flying over the disk surface by forming the optical and magnetic components integral with the slider, whereby the laser beam is irradiated through the slider body and directly focussed on the MO read-write layer.

The recording density of MO disk types, including magnetic super-resolution ("MSR"), near field recording ("NFR"), and hybrids thereof, when utilized as FSMO-configured disks, depends, in major respect, on the spot size of the focussed laser beam(s) employed for writing (and reading-out) information stored in the MO medium layer(s). The minimum spot size or diameter d is limited by diffraction according to the relation $d=0.5\lambda/NA$, where $\lambda$ is the wavelength of the laser light and NA is the numerical aperture of the objective lens of the focussing system. In MO systems utilizing conventional technology, i.e., wherein laser irradiation of the MO medium layer is through a transparent substrate, head-disk spacings are typically in the range of hundreds of microns. However, as indicated supra, first surface magneto-optical (FSMO) systems utilizing non-transparent substrates can be devised in which a flying head slider integrally incorporates the requisite optical and magnetic components. In systems of such configuration, the laser beam passes through the slider body and is directly focussed on the MO storage medium layer. Near-field optical techniques have been developed for use with such systems in order to overcome the above-mentioned diffraction limit by using a high refractive index material as a solid immersion lens ("SIL"), which SIL is positioned between the objective lens and the FSMO-configured disk. In such systems, the laser beam spot size or diameter is determined by the aperture size of the SIL, which aperture size can be much smaller than that possible with conventional optical focussing systems.

The spacing, or air-gap, between the SIL and the FSMO-configured disk surface is termed the "flying height" or "glide height" for flying-head recording. In the past, most research on FSMO systems utilizing SIL-type optics was directed towards achieving a flying or glide height of about 5 microinches (127 nm). However, the continuing requirement for greater recording/storage density with good coupling efficiency necessitates further decrease in the flying or glide height of such FSMO-based storage systems. Such systems and media therefor are conventionally termed low glide magneto-optical ("LGMO") or near-field recording ("NFR") systems and media.

Such LGMO or NFR recording media, when fabricated in disk form for rotation about a central axis, can be adapted for use in conventional Winchester, or hard drive, devices as are employed with conventional magnetic recording media. As indicated above, hard drives typically employed for such disk-shaped media utilize flying heads for mounting transducer/sensor devices, etc., thereon, for close positioning thereof adjacent the surface of the recording media. In operation, a typical contact start/stop (CSS) method commences when a data transducing head begins to slide against the surface of the disk as the disk begins to rotate. Upon reaching a predetermined high rotational speed, the head floats in air at a predetermined small distance from the surface of the disk, where it is maintained during reading and recording operations. Upon terminating operation of the disk drive, the head again begins to slide against the surface of the disk and eventually stops in contact with and pressing against the disk. Therefore, as in the case of magnetic disks, a protective overcoat layer and a lubricant topcoat layer are typically applied to the disk surface for minimizing scratching and abrasion of the sensor/transducer head and the recording media surface, which can result in an undesirably high wear rate of the head and recording media surface.

A difficulty encountered in the development of wear-resistant, lubricated, ultra-high recording density, FSMO-configured LGMO or NFR media and Winchester-type drives therefor, is the above-mentioned requirement imposed by the impetus for achieving ever-higher density recording, which necessitates even further reduction in the disk-transducer/sensor spacing and mandates good coupling efficiency. The head-to-disk interface (HDI) becomes very critical as head-to-disk spacing is reduced and head fly height decreases. Conventional MO and FSMO media without a protective overcoat and lubricant layer have extremely poor tribological performance, resulting in lack of reliability of MO-based disk drives. In addition, conventional substrate materials, as supplied by their respective manufacturers, comprise surfaces including defects, asperities, etc., of sufficient magnitude and/or dimension as to be incompatible with the requirement for very low head glide height, in that the asperities, defects, etc. of the substrate surface are substantially replicated within the various MO and dielectric layers deposited thereover, including the ultimate, or outermost layer destined to be proximate the head slider.

The above-described problems, including disk crashing during head loading, associated with the requirement for reduced head-to-disk spacing and fly height, are further exacerbated in the case of FSMO-configured LGMO media wherein the optical and magnetic components of the recording system are incorporated into the head slider.

Thus, there exists a need for reliable, high recording density single- and dual-sided FSMO-configured LGMO disks and disk-based devices, which disks allow operation with flying heads at substantially reduced flying or glide heights and which effectively eliminate the problems and drawbacks associated with the conventional technology, i.e., scratching, abrasion, brittleness, increased wear of transducer/sensor head and recording media surfaces, and tendency for crashing during head loading, while advantageously providing good coupling efficiency.

The present invention addresses and solves the problems attendant upon the manufacture and use of high density MO media, including FSMO-configured, disk-shaped LGMO or NFR recording media and hard drives, including magnetic super-resolution (MSR)-type disks and hybrids thereof, while maintaining full compatibility with all mechanical aspects of conventional disk drive technology.

DISCLOSURE OF THE INVENTION

An advantage of the present invention is a method of manufacturing ultra-high recording density, low glide height, FSMO-configured recording/data storage and retrieval media, including NFR, MSR, and hybrid types, for use with flying heads operating at extremely low flying or glide heights, while at the same time exhibiting good coupling efficiency, improved tribological performance and long-term durability.

Another advantage of the present invention is a method of treating the deposition surfaces of substrates for use in the manufacture of ultra-high recording density, FSMO-configured recording/data storage and retrieval media, which surface treatment permits operation of finished MO disks at very low glide or flying head heights.

A further advantage of the present invention is a method of manufacturing FSMO-configured, ultra-high recording density disk-shaped MO media for use in information/data storage and retrieval systems having a flying head slider at a flying or glide height less than about 2 microinches above the disk surface, with reduced wear and increased coupling efficiency.

Still another advantage of the present invention is single- and dual-sided, ultra-high recording density, FSMO-configured information/data storage and retrieval media having substrates including improved deposition surfaces providing improved tribological performance at very low flying head or glide heights.

Additional advantages and other features of the present invention will be set forth in the description which follows and in part will become apparent to those having ordinary skill in the art upon examination of the following or may be learned from practice of the present invention. The advantages of the present invention may be realized and obtained as particularly pointed out in the appended claims.

According to one aspect of the present invention, the foregoing and other advantages are obtained in part by a method of manufacturing a high recording density magneto-optical (MO) information storage and retrieval medium, comprising the sequential steps of:

(a) providing a substrate comprising at least one deposition surface;

(b) mechanically polishing said at least one deposition surface to reduce the asperity thereof; and (c) photolytically treating the polished at least one deposition surface to remove contaminants and debris therefrom.

According to embodiments of the present invention, step (a) comprises providing a substrate, e.g., a disk-shaped substrate having a pair of opposed major deposition surfaces, and comprising a material selected from the group consisting of: glass, metal alloys, aluminum (Al), NiP-coated Al, polymers, ceramics, glass-ceramics composites, and glass-polymer composites; step (b) comprises performing a tape burnishing process which, according to a specific embodiment of the present invention, comprises a first step of buffing the at least one deposition surface with a moving tape having a surface coated with finely-dimensioned abrasive particles, followed by a second step of wiping the polished at least one deposition surface with a moving tape having a non-abrasive surface; step (c) comprises photolytically treating, e.g., with UV radiation according to a specific embodiment, the polished at least one deposition surface in an ozone-containing atmosphere, and further contacting the polished at least one deposition surface with an inert gas atmosphere subsequent to the photolytic treatment.

According to embodiments of the present invention, the method comprises the further step (d) of depositing a stacked plurality of layers comprising at least one magneto-optical (MO) layer on the polished at least one deposition surface of the substrate.

According to an embodiment of the present invention, the MO medium is configured as a near field recording-first surface magneto-optical (NFR-FSMO)-type medium and a stacked plurality of layers (i)–(vii) deposited in step (d) comprises, in sequence from the polished at least one deposition surface of the substrate:

(i) a heat sinking and reflective layer;
(ii) a first dielectric layer comprising a material which is substantially transparent to the wavelength(s) of at least one laser beam used for writing and reading-out information stored in the medium;
(iii) an MO auxiliary, writing assist layer comprising a rare earth/transition metal (RE-TM) material;
(iv) an MO read-write layer comprising an RE-TM thermo-magnetic material having perpendicular anisotropy, large perpendicular coercivity, and high Curie temperature;
(v) a second dielectric layer comprising a material which is substantially transparent to the wavelength(s) of at least one laser beam used for writing and reading-out information stored in the medium;
(vi) a thin, abrasion-resistant, protective flash layer overcoat (FLO) over the transparent dielectric layer, the FLO layer being substantially transparent to the wavelength(s) of the at least one laser beam used for writing and reading-out information stored in the medium; and
(g) a thin lubricant topcoat layer over the FLO.

According to particular embodiments of the present invention, the heat sinking and reflective layer (i) comprises aluminum (Al) or an alloy thereof; each of the first and second substantially transparent dielectric layers (ii) and (v) comprises a material selected from the group consisting of $SiN_x$, $AlN_x$, $SiO_x$, and $AlO_x$; the MO auxiliary, writing assist layer (iii) comprises an RE-TM material selected from group consisting of: TbFe, TbFeCo, and FeCoX, where X is Dy, Gd, or Sm; the MO read-write layer (iv) comprises an RE-TM material selected from the group consisting of: TbFe, TbFeCo, TbDyFeCo, and TbFeCoX, TbDyFeCoX, and DyFeCoX, where X is Al, Y, or Nd; the thin, protective FLO (vi) comprises a carbon-based material selected from the group consisting of: ion beam-deposited carbon, plasma-enhanced chemical vapor deposition (PECVD) carbon, a-$CN_x$, a-$CH_x$, and a-$CN_xH_y$; and the thin, lubricant topcoat layer comprises a fluoropolyether or perfluoropolyether (PFPE) material.

According to a further embodiment of the present invention, step (a) comprises providing a substrate including a pair of opposed major deposition surfaces; steps (b) and (c) are performed on each of the pair of major surfaces; and step (d) comprises forming the stacked plurality of layers (i)–(vii) on each of the pair of opposed major deposition surfaces.

According to another embodiment of the present invention, the MO medium is configured as a magnetic super resolution, first surface magneto-optical (MSR-FSMO)-type medium and a stacked plurality of layers (i)–(x) deposited in step (d) comprises, in sequence from the at least one deposition surface of the substrate:

(i) a heat sinking and reflective layer;
(ii) a first dielectric layer comprising a material which is substantially transparent to the wavelength(s) of at least one laser beam used for writing and reading-out information stored in the medium;
(iii) an MO auxiliary, writing assist layer comprising a rare earth/transition metal (RE-TM) material;
(iv) an MO writing layer comprising an RE-TM thermo-magnetic material having perpendicular anisotropy, large perpendicular coercivity, and high Curie temperature;
(v) in the case of magneto-exchange coupling type MSR media, an exchange coupling layer comprising an RE-TM material in contact with the MO writing layer for increasing the recording density of the MO writing layer by replicating the magnetic orientation thereof by exchange coupling and increasing the coupling force between the MO writing layer and a spaced-apart MO read-out layer; or
(vi) in the case of magneto-static coupling type MSR media, a second dielectric layer comprising a material which is substantially transparent to the wavelength(s) of the at least one laser beam used for writing and reading-out information stored in the medium for performing magneto-static coupling between the MO writing layer and a MO read-out layer;
(vii) an MO read-out layer comprising an RE-TM material having a small coercivity and low Curie temperature;
(viii) a third dielectric layer comprising a material which is substantially transparent to the wavelength(s) of the at least one laser beam used for writing and reading-out information stored in the medium;
(ix) a thin, abrasion-resistant, protective flash layer overcoat (FLO) over the third, substantially transparent dielectric layer, the FLO layer being substantially transparent to the wavelength(s) of the at least one laser beam used for writing and reading-out information stored in the medium; and
(x) a thin lubricant topcoat layer over the protective FLO.

According to particular embodiments of the present invention, the heat sinking and reflective layer (i) comprises aluminum (Al) or an alloy thereof; each of the first, second, and third substantially transparent dielectric layers (ii), (vi), and (viii) comprises a material selected from the group consisting of: $SiN_x$, $AlN_x$, $SiO_x$, and $AlO_x$; the MO auxiliary, writing assist layer (iii) comprises an RE-TM material selected from the group consisting of: TbFe, TbFeCo, and FeCoX, where X is Dy, Gd, or Sm; the MO writing layer (iv) comprises an RE-TM material selected from the group consisting of: TbFe, TbFeCo, TbDyFeCo, and TbFeCoX, TbDyFeCoX, and DyFeCoX, where X is Al, Y, or Nd; the exchange coupling layer (v) comprises an RE-TM material comprising GdFeCo; the MO read-out layer (vii) comprises an RE-TM material selected from the group consisting of: GdFeCo and GdFeCoX, where X is Al, Nd, or Y, and GdFeCoXX', where X is Al, Nd, or Y and X' is Cr, Ta, or Nb; the thin, protective FLO (ix) comprises a carbon-based material selected from the group consisting of: ion beam-deposited carbon, plasma-enhanced chemical vapor deposition (PECVD) carbon, a-$CN_x$, a-$CH_x$, and a-$CN_xH_y$; and the thin, lubricant topcoat layer comprises a fluoropolyether or perfluoropolyether (PFPE) material.

According to a further embodiment of the present invention, step (a) comprises providing a substrate including a pair of opposed major deposition surfaces; steps (b) and (c) are performed on each of the pair of major surfaces; and step (d) comprises forming the stacked plurality of layers (i)–(x) on each of the pair of opposed major deposition surfaces.

According to yet another aspect of the present invention, single- and dual-sided NFR-FSMO and MSR-FSMO configured MO media fabricated according to the inventive process are provided.

According to still another aspect of the present invention, a low glide height FSMO-configured data/information storage and retrieval system comprises:

a disk-shaped, high recording density FSMO data/information storage and retrieval medium having a surface; and means for positioning a flying head slider at a fly height less than about 2 μin. away from the disk surface.

Additional advantages of the present invention will become readily apparent to those skilled in the art from the following detailed description, wherein only preferred embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiments of the present invention can best be understood when read in conjunction with the following drawing, wherein.

Figure 1:
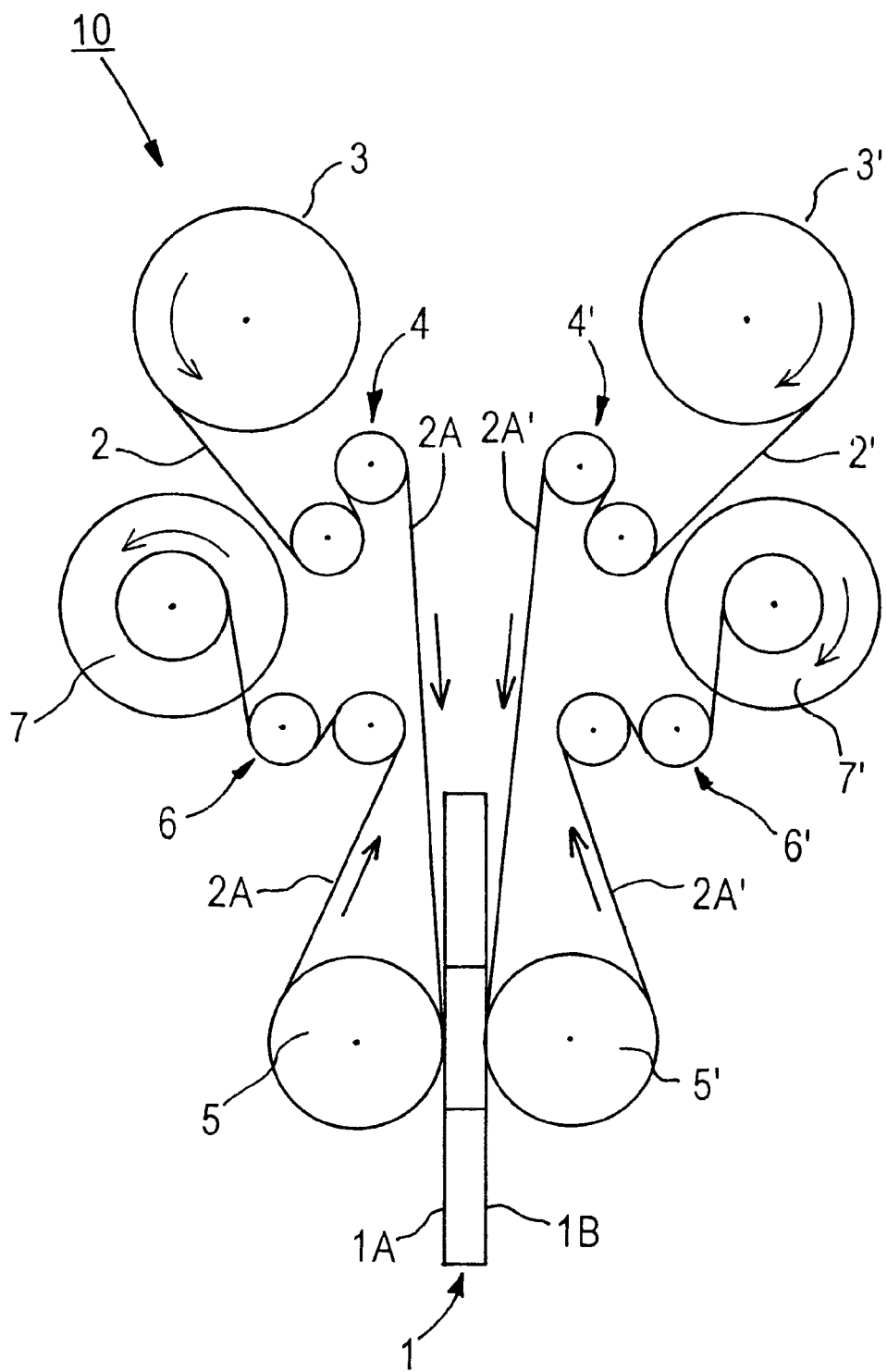
FIG. 1 illustrates, in simplified, cross-sectional schematic view, an apparatus for performing tape burnishing of MO disk substrate surfaces according to the present invention.

It should be recognized that the various layers forming the layer stacks or laminates illustrated in the appended drawing figures as representing cross-sections of portions of FSMO-configured media fabricated according to the inventive methodology are not drawn to scale, but instead are drawn as to best illustrate the features of the present invention.

DESCRIPTION OF THE INVENTION

The present invention is based on the discovery that FSMO-configured, ultra-high recording density, low glide height magneto-optical (LGMO) media can be obtained by performing a novel, two-step treatment of the media substrate deposition surface(s) prior to deposition thereon, i.e., a first step of tape polishing by burnishing/buffing+wiping, followed by a second step of photolytic treatment for removal of contaminants and debris from the polished surface(s), which two-step treatment eliminates, or at least substantially reduces, surface asperities which would otherwise be disadvantageously replicated in subsequently deposited layers constituting the MO medium. In addition, according to the invention, an appropriate combination of a highly polished substrate surface according to the above-described inventive methodology and a thin "flash-layer" protective overcoat ("FLO")/lubricant topcoat layer system is provided which permits operation of FSMO-configured disks at very low flying head or glide heights, i.e., less than about 2 μin. (ca. 50 nm) above the media surface, e.g., less than about 1 μin. (ca. 25 nm) when employed with SIL systems providing very small laser spot sizes. More specifically, the combination of polished substrate deposition surface formed according to the inventive methodology and appropriately selected FLO protective layer/lubricant topcoat layer systems provides optimal tribological performance of disk-shaped, FSMO-configured media, including NFR, MSR, and hybrid-type MO layer stack constitution.

According to the present invention, in order to achieve the stated objectives of low glide height and good tribological performance, at least one surface of a suitable substrate material, e.g., of glass, metal alloys, aluminum (Al), Al alloys, Ni—P coated aluminum, ceramics, glass-ceramic composites, and glass-ceramics composites is subjected to a novel two-step fine polishing treatment prior to deposition thereon of the various MO medium layers thereon, for eliminating, or at least substantially reducing asperities in or of the surface(s) of as-received substrate blanks, whereby disadvantageous replication of rough surface topography caused by the asperities, is avoided, thereby facilitating formation of very low glide height MO media.

The two-step fine polishing treatment of the substrate deposition surface(s), according to the inventive methodology, comprises a first step of mechanically polishing the substrate surface, and in turn comprises steps of tape burnishing or buffing for substantially removing the surface asperities and tape wiping for even finer polishing and to maintain surface cleanliness. The tape burnishing/buffing phase utilizes an apparatus configured to continuously supply a moving tape having a surface which is coated with finely divided abrasive particles, e.g., alumina ($Al_2O_3$), which surface is urged, with normal load pressure, against a rotating deposition surface of an MO substrate, e.g., a disk-shaped substrate having a pair of opposed major planar deposition surfaces. The tape wiping phase is similarly performed with a similarly configured apparatus; however, the surface of the moving tape which is urged against the rotating substrate surface is not coated with abrasive particles.

The second step according to the inventive methodology for treating MO media substrate surfaces prior to layer stack deposition thereon comprises subjecting the thus mechanically polished (i.e., tape burnished+tape wiped) substrate surface(s) to photolytic treatment, as by UV irradiation, in an atmosphere comprising ozone ($O_3$) gas. The inventive combination of mechanical polishing (i.e., by tape burnishing+ tape wiping) and photolytic treatment of the polished surface (s) in an ozone-containing atmosphere provides a synergistic effect, i.e., a greater reduction in asperity, or surface roughness, than can be expected or realized by performing either treatment alone.

Referring now to FIG. 1, shown therein in simplified, cross-sectional schematic view is an illustrative, but non-limitative, embodiment of an apparatus 10 adapted for performing the first, or mechanical polishing step according to the inventive methodology simultaneously on both major surfaces 1A, 1B of a disk-shaped MO substrate 1 which rotates (by means not shown in the drawing for illustrative simplicity) about a central axis perpendicular to the major surfaces 1A, 1B. Moving tapes 2, 2', the respective outer surfaces 2A, 2A' of which are coated with very finely-dimensioned (e.g., 0.3 $\mu$m diameter) abrasive particles (e.g., of alumina, $Al_2O_3$) are fed from supply rolls or spools 3, 3' via cooperating pairs of guide/idler rollers 4, 4' to be urged against the respective rotating substrate surfaces 1A, 1B with a desired contact force by means of roller drums 5, 5' which are controllably normally loaded (by means not shown for illustrative simplicity) against the substrate surfaces. Following abrasive contact of substrate surfaces 1A, 1B with respective outer tape surfaces 2A, 2A', tapes 2, 2' are fed, via respective pairs of cooperating guide/idler rollers 6, 6' to respective take-up spools or drums 7, 7'. Each of the substrate 1 rotational speed, tape 2 advancement velocity and normal load force against the substrate 1 can be varied for use in a particular situation, as, for example, with different substrate materials and different asperities of the starting substrate blank material as supplied by the manufacturer. In addition, the size and nature of the abrasive particles can be selected for use in a particular application.

Apparatus identical or similar to apparatus 10 described above can be utilized for the tape wiping phase or sub-step of the first, tape burnishing step of the inventive method by replacement of abrasive coated tapes 2, 2' with non-abrasive tapes. The operating parameters such as substrate rotation speed, tape advancement velocity, and normal load force during the tape wiping phase can be essentially the same or different than that utilized in the tape burnishing step, and in any event, can be optimized for use in a particular application.

Figure 2:
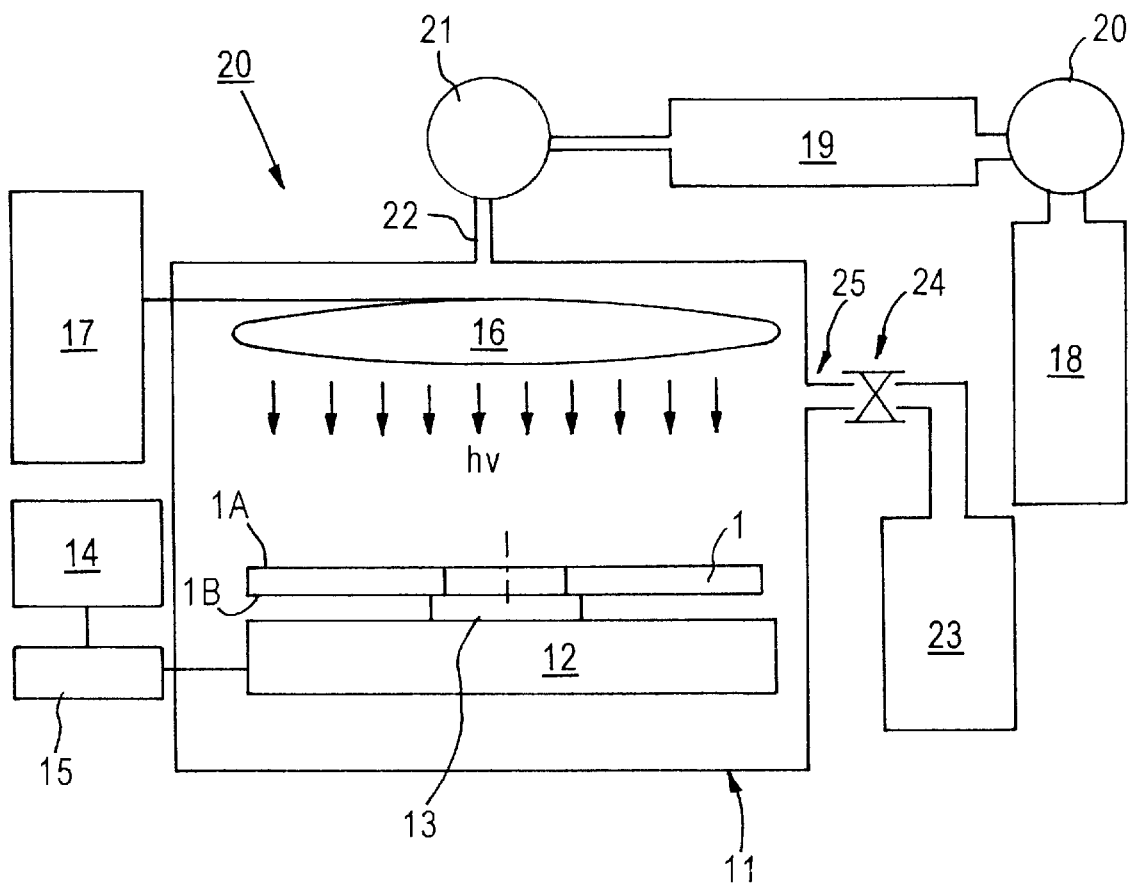
FIG. 2 illustrates, in simplified, cross-sectional schematic view, an apparatus for performing photolytic treatment of MO substrate surfaces according to the present invention.

Referring now to FIG. 2, shown therein in simplified, cross-sectional schematic view, is an illustrative, but not limitative, embodiment of an apparatus 20 utilized for performing the second, photolytic treatment step of the tape burnished/wiped substrate surface(s) 1A, 1B, according to the inventive methodology.

As illustrated, photolytic treatment apparatus 30 comprises chamber 11 having at its lower end an electrically heatable plate 12 including on its upper surface a substrate holder 13 for rotatably mounting disk substrate 1 thereon such that the lower surface thereof (i.e., 1B) is spaced a distance above plate 12 for allowing the latter to be freely in contact with any gas atmosphere present in chamber 11. Power supply 14 and associated temperature controller 15 are electrically connected to heatable plate 12 for controllably regulating the temperature of substrate 1. A source 16 of ultra-violet (UV) radiation, e.g., a high pressure Hg lamp, is positioned at the upper end of chamber 11, facing the upper surface 1A of substrate 1, and is electrically energized via power supply 17. A source 18 of high purity (e.g., 99.9% pure) oxygen ($O_2$) gas is fluidly connected to an ozone ($O_3$) generator 19 (e.g., of conventional electrostatic type) via pressure regulator 20, and ozone generated therein is supplied to the interior of photolytic treatment chamber 11 via mass flow controller 21 and gas inlet conduit 22. A source 23 of inert gas, e.g., nitrogen ($N_2$) is fluidly connected to chamber 11 for selectively controllable supply thereto via valve 24 and gas inlet conduit 25.

In operation, a disk-shaped substrate 1 is installed on rotatable mount 13 and power supply 14/temperature controller 15 energized to heat substrate to a predetermined temperature. Ozone gas supplied to photolytic treatment chamber 11 from generator 19 is photochemically activated by UV photons hv supplied from UV radiation source 16. The mass flow rate of ozone as well as the UV flux intensity are not especially critical; however, each should be sufficient as to yield an economically viable product throughput consistent with the requirements of automated mass production technology. While not desiring to be bound by any particular theory, it is believed that oxygen-containing radicals generated by UV-induced photochemical decomposition of ozone ($O_3$) molecules act to clean the abrasively polished surfaces 1A, 1B of disk substrate 1, thereby removing contaminants and debris therefrom. An inert gas, e.g., nitrogen, is supplied to chamber 11 for an interval after photolytic treatment in order to purge any remaining traces of reactive, e.g., oxidizing, species prior to removal of the photolytically treated substrate 1 therefrom, for deposition thereon of the various layers constituting the MO medium. The combination of tape burnishing/wiping+photolytic treatment, for reasons which are not fully understood, yields a synergistic reduction is substrate surface asperity and roughness, as is evident from the following illustrative, but non-limitative Example, thereby providing substrates with polished surfaces ideally suited for the manufacture of very low glide height MO media.

EXAMPLE

As-received disk-shaped glass substrates were subjected to tape burnishing and tape wiping treatment utilizing an apparatus substantially as illustrated in FIG. 1 and described above. A normal load force of about 0.8 lb. was simultaneously applied to both disk surfaces while rotating the disk about a central spindle at about 600 rpm. The tape (available from Mipox, Hayward, Calif.) comprised 0.3 $\mu$m diameter alumina ($Al_2O_3$) particles on a woven polyester base; tape advancement velocity was at a rate of about 8 in./min. The tape motion was intermittent, i.e., pulsed, with alternating contact (i.e., abrasive) periods of about 3 sec. and rest periods of about 1 sec. The contact/rest process was repeated 3 times. After completion of tape burnishing utilizing the abrasive-coated tape, tape-wiping was performed with a non-abrasive, woven polyester tape. Disk rotation during tape wiping was about 400 rpm, tape advancement velocity was 4 in./min., and 2 contact/rest sequences were performed with a 3 sec. wiping interval. Following completion of tape wiping, the substrates were placed in the chamber of a photolytic treatment apparatus (available from Samco, Inc., San Jose, Calif.) substantially similar to apparatus 30 illustrated in FIG. 2 and described above. Ozone ($O_3$) gas was generated from a source of 99.9% pure oxygen ($O_2$) gas and was irradiated with UV photons to effect stripping of all organic, hydrocarbon, and moisture contaminants, as well as abrasive debris, from the disk surfaces 1A, 1B. The heater was not activated in this example; however the temperature of substrate 1 increased during photolytic treatment due to photon bombardment; and treatment was completed in about 3.5 min. The chamber was purged with nitrogen gas upon completion of treatment. Table 1 shows the effect of surface treatment on the roughness parameters (as measured by atomic force microscopy, AFM) of glass disks used in the manufacture of MO media, including NFR and MSR-type media fabricated in FSMO configurations. In the following Table 1, $R_a$ is the arithmetic average surface roughness (in nm); RMS is the root mean square roughness (in nm); $R_{max}$ is the difference (or distance) between the highest and lowest points on the surface relative to the mean plane (in nm); and $R_z$ is the average difference in height between the five highest peaks and the five lowest valleys relative to the mean plane.

TABLE 1

| | $R_a$ (nm) | RMS (nm) | $R_{max}$ (nm) | $R_z$ (nm) |
|---|---|---|---|---|
| As-received glass | 2.197 | 4.496 | 15.557 | 8.839 |
| Tape burnished/wiped | 0.639 | 1.528 | 3.673 | 2.067 |
| Tape burnished/wiped + photolytic-$O_3$ treated | 0.300 | 0.398 | 2.390 | 1.609 |

As is apparent from Table 1, each of the measured surface roughness parameters was improved by performing tape burnishing/tape wiping treatment; however, an unexpected and remarkable further improvement in each of the measured surface roughness parameters was observed by performing the photolytic-$O_3$ treatment on the tape burnished/tape wiped substrates. It is noteworthy that if $R_a$<0.3 nm, the fly height can be less than 0.5 μin., and with fly height<0.5 μin., areal recording density can be as high as 400 Gb/in$^2$. Thus, the inventive methodology provides a simple, convenient, and rapid process for providing substrate surfaces with roughness parameters suitable for use in very low glide height, very high recording density MO media, i.e., roughness parameters low enough such that topographical features of the surface are not replicated in the various MO medium layers deposited thereover, including the layers proximate the flying head.

Figure 3:
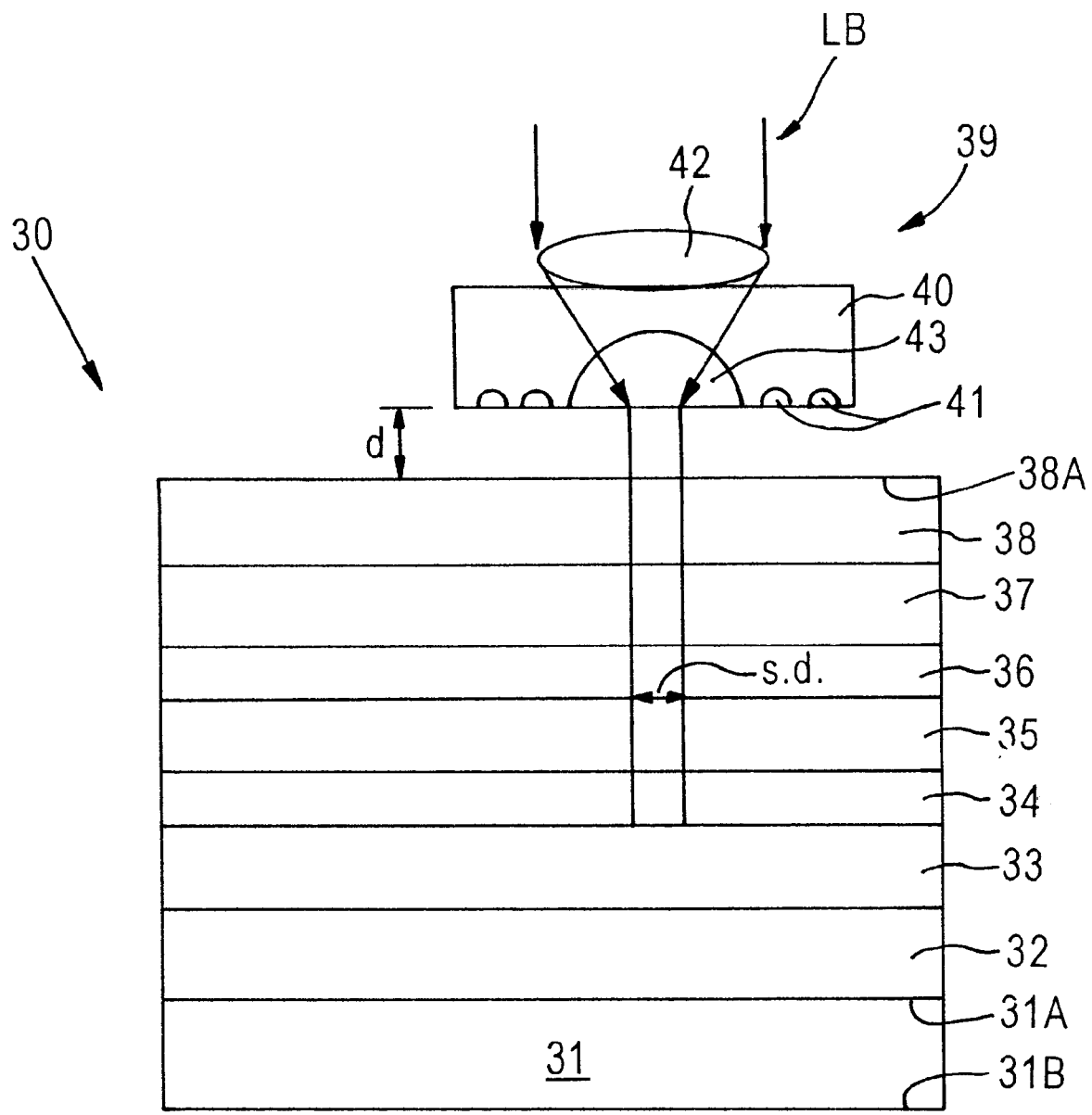
FIG. 3 illustrates, in simplified, cross-sectional schematic form, an NFR-FSMO-configured magneto-optical data/information storage and retrieval medium according to an embodiment of the present invention.

An embodiment of a near field recording-first surface magneto-optical (NFR-FSMO) medium and system according to the present invention comprises a single-sided, ultra-high recording density, NFR or low glide height magneto-optical (LGMO) medium 30 utilizing a substrate subjected to the inventive synergistic combination of surface treatments and an MO layer stack (i.e., laminate) including a flash layer protective overcoat (FLO)/lubricant topcoat layer system and is illustrated in FIG. 3, wherein reference numeral 31 denotes a disk-shaped substrate comprising a pair of major, planar, opposed surfaces 31A and 31B. The substrate material may be, for example, a material selected from: glass, metal alloys, aluminum (Al), Al alloys, NiP-plated Al, polymers, ceramics, glass-ceramics composites, and glass-polymer composites. The thickness of substrate 31 is not critical, but should provide adequate rigidity during rotation and static periods. Typically, at least one of the major, planar, opposed surfaces, 31A in the illustration, is subjected to the inventive two-phase, synergistic surface treatment, as described supra, prior to MO medium layer deposition thereon. By way of illustration, but not limitation, the surface(s) of disk substrates comprised of glass may be subjected to synergistic tape burnishing/wiping+photolytic treatment as described in Table 1.

According to the embodiment, formed on a first one (31A) of the opposing major surfaces of substrate 31 is a layer stack, comprising, in overlying sequence from substrate surface 31A: (a) a reflective, heat-sinking layer 32, typically about 300–500 Å thick, e.g., 400 Å thick, typically comprising Al or an alloy thereof, e.g., AlCr, AlTi, AlCu, AlMo, etc. Layer 32 may also serve to prevent laser beam transmission through the substrate 1 when the latter is transparent, as in the case of glass or glass-based materials, and thus render surface 31A opaque; (b) a first dielectric material layer 33, typically about 100–400 Å thick, preferably about 100–200 Å thick, and substantially transparent to the wavelength(s) of the at least one laser beam employed for writing and reading out information stored in the medium, typically selected from $SiN_x$ (where x=ca. 0.8–1.33), $AlN_x$ (where x=ca. 1–1.5), $SiO_x$ (where x=ca. 1–2.0), and $AlO_x$ (where x=ca. 1–1.5); (c) an MO auxiliary, writing assist layer 34 comprising a rare-earth/transition metal (RE-TM) material about 50–100 Å thick, typically selected from TbFe, TbFeCo, and FeCoX, where X is Dy, Gd, or Sm; (d) an MO read-write layer 35, for example, comprising a rare earth-transition metal thermo-magnetic (RE-TM) material, typically about 200–300 Å thick, e.g., about 250 Å thick, and having perpendicular anisotropy, large perpendicular coercivity $H_c$ at room temperature, and high Curie temperature $T_C$, typically selected from TbFe, TbFeCo, TbDyFeCo, and TbFeCoX, DyFeCoX, and TbDyFeCoX, where X is Al, Y, or Nd, and DyFeCoX, where X is Y, Nd, or Al (for example, TbFeCo normally has a Curie temperature $T_C$ in the range of about 150 to about 300° C., at which the magnetic moment of the domain disappears as the temperature thereof reaches $T_C$ as a result of irradiation by the focussed laser beam). The RE-TM material also has a special feature of reaching infinitely high coercivity and zero magnetic moment at the compensating temperature $T_{comp}$, in the range of about 50 to about 100° C. for TbFeCo. The temperature range between $T_{comp}$ and $T_C$ is employed for overwriting the data bits, the carrier-to-noise ratio (CNR) being proportional to the Kerr rotation angle and the reflectivity of the medium; (e) a second substantially transparent dielectric material layer 36, typically about 200–1000 Å thick, e.g., about 800 Å thick for red lasers and about 400–500 Å thick, e.g., 425 Å thick for blue lasers, and transparent to the wavelength(s) of the at least one laser beam employed for writing and reading out information, typically selected from $SiN_x$, $AlN_x$, $SiO_x$, or $AlO_x$, where x in each instance is as given above for layer 3 (the thickness can be varied, as desired, to meet a criterion of finished disk reflectivity in the range of about 18 to about 24%); (f) a thin, abrasion-resistant, protective flash overcoat layer (FLO) 37, typically not greater than about 10 Å thick, e.g., about 5 to about 10 Å thick, and substantially transparent to the wavelength(s) of the laser beam(s) utilized during writing and reading-out operations while improving mechanical and tribological performance of the head-disk interface ("HDI") of the LGMO system. FLO layer 37 typically comprises a material selected from ion beam-deposited carbon, plasma-enhanced chemical vapor deposition (PECVD) carbon, a-$CN_x$ (where x=0.05–0.30), a-$CH_x$, (where x=0.20–0.30), and a-$CN_xH_y$ (where x=0.03–0.10 and y=0.15–0.30); and (g) a lubricant topcoat layer 38, typically having a thickness of less than about 25 Å, e.g., from about 5 to less than about 25 Å and comprising a fluoro-polyether or perfluoro-polyether polymer material, e.g., perfluoro-polyethylene (PFPE).

Also illustrated in FIG. 3 is a head slider 39 positioned at a head-to-disk spacing d above surface 38A of layer 38 of LGMO medium 30, head slider 38A being formed with integrally mounted optical focussing/detector-sensor and magnetic bias field systems, and comprising a head slider body 40; magnetic coils 41 for applying a magnetic bias field to the MO auxiliary, writing assist layer 34 and MO writing layer 35; objective lens 42; solid immersion lens ("SIL") 43; and optoelectric sensor means (not shown). In operation, laser beam LB (from a laser source not shown for illustrative simplicity) is focussed by the combination of objective and solid immersion lenses 42, 43 into a narrow, collimated beam having very small spot size or diameter s.d., which beam can be utilized for writing and reading-out stored information from MO layer 35.

With continued reference to FIG. 3, the optical coupling efficiency of the illustrated LGMO system is a function of the numerical aperture (NA) of the lens system 42/43 and the flying height (or head-to-disk spacing) d. Minimum laser spot size or diameter s.d. requires the shortest possible wavelength $\lambda$ and the highest NA material. However, the coupling efficiency decreases very rapidly when the flying height d exceeds about 2 $\mu$in. (50 nm). Therefore, the optimal manner by which minimum spot size s.d. and good coupling efficiently can be obtained is by design of media with lowest possible glide height, i.e., LGMO media as hereinabove described. As compared with other types of recording media, including conventional MO media, LGMO media with very low glide heights can advantageously provide ultra-high recording density. NFR or LGMO media and systems fabricated as described above exhibit areal recording densities as high as 100–400 Gb/in$^2$ when utilized with head fly (or glide) heights below about 2 $\mu$in. (ca. 50 nm), e.g., below about 1 microinch (ca. 25 mm). More specifically, when fly height<1 $\mu$in., recording densities of about 100 Gb/in$^2$ are obtainable with magnetic domains having a diameter of about 60 nm; whereas, when fly height<0.5 $\mu$in. (at $R_a$<3 Å), recording densities of about 400 Gb/in$^2$ are obtainable with magnetic domains having a diameter of about 30 nm. Moreover, by using glass substrates and Co/Pt superlattice structures as multilayer MO media, magnetic domains as small as 20 nm can be realized. Accordingly, recording densities with such NFR or LGMO media can reach about 400–600 Gb/in$^2$ at fly heights of less than about 0.5 $\mu$in. and magnetic domain diameters of from about 20 to about 30 nm.

Another embodiment of the present invention (not shown in the drawing for brevity) comprises a dual-sided NFR or LGMO type, FSMO-configured medium and system corresponding to the single-sided embodiment shown in FIG. 3 and described above. Such dual-sided media advantageously may be operated to record and read out information from both sides of a common substrate, and thus are useful for increasing storage density. The dual-sided embodiment comprises a second layer stack formed on the second, two-step, synergistically treated major surface 31B of substrate 31, in opposing relation to the first layer stack formed on the first major surface 31A, with both layer stacks being identically constituted and processed as described with respect to the single-layer stack embodiment shown in FIG. 3, along with a second, identically configured head slider 39.

Conventional techniques, such as PVD and/or CVD may be employed for depositing each of the reflective, dielectric, read-write, and ultra-thin FLO layers of the layer stacks of the above-described embodiments, with sputtering generally being preferred. By way of illustration, but not limitation, a-CH$_x$ FLO layers may be deposited on suitably dielectric layer coated MO substrates by AC sputtering of a 3 by 15 inch graphite target at frequencies in the range of 40–400 KHz at a power in the range of 0.5–2 KW in an atmosphere of 15% H$_2$/85% Ar. Similar conditions may be employed for forming a-CN$_x$ and a-CN$_x$H$_y$ FLO coatings by use of N$_2$ and H$_2$—N$_2$ gas mixtures, respectively. Given the present disclosure and objectives of the invention, determination and selection of deposition parameters necessary for obtaining equivalently usable abrasion-resistant carbon-containing FLO coatings by other conventional film-forming techniques is considered within the ambit of the artisan for use in a particular situation.

The lubricant topcoat layer formed over the protective FLO layer, in embodiments according to the present invention, comprises fluoropolyether or perfluoropolyether polymer materials such as, for example, perfluoropolyethylene (PFPE), and like materials available under the tradenames Fomblin ZDol, Fomblin Z Tetraol, and Fomblin Z-Dol TX from Ausimont Co., Thorofare, N.J., and has a thickness not greater than about 25 Å, e.g., from about 5 to less than about 25 Å.

The lubricant topcoat layer can be applied in any conventional manner, as by dipping the MO laminate/substrate in a dilute solution of the lubricant in a suitable solvent, e.g., a hydrofluorocarbon, or by spraying, etc. Desirably, the surface of the uppermost layer of the MO laminate is preliminarily treated to be free of impurities so that good bonding can occur between the functional end groups of the lubricant polymer molecules and the disk surface (i.e., the FLO layer). The bonding of the lubricant to the laminate surface can be enhanced by cleaning the surface of the FLO protective layer with a mild plasma or a solvent rinse prior to applying the lubricant.

Figure 4:
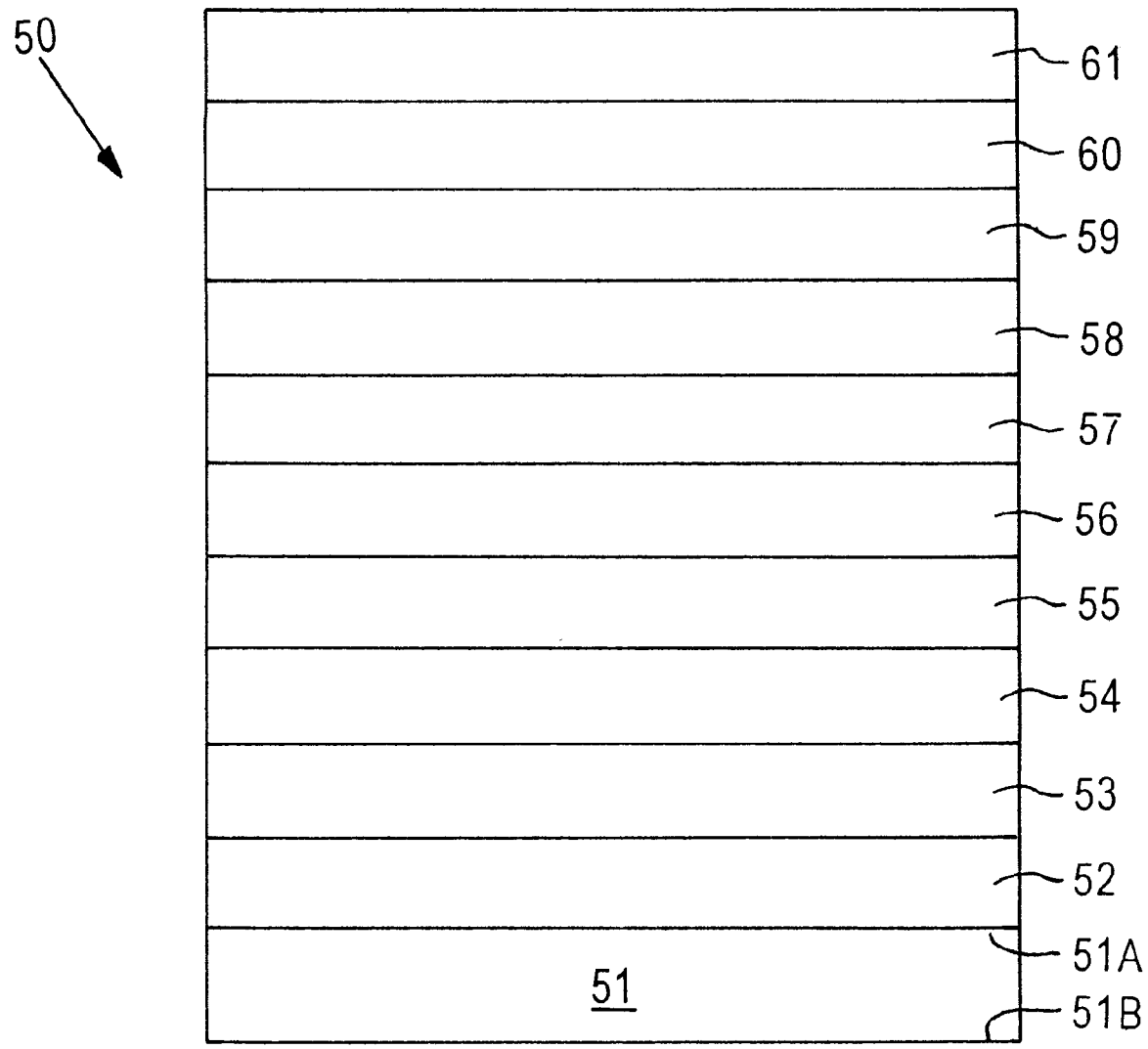
FIG. 4 illustrates, in simplified, cross-sectional schematic form, an MSR-FSMO-configured magneto-optical data/information storage and retrieval medium according to another embodiment of the present invention.

Referring now to FIG. 4, illustrated therein is another embodiment of the present invention, i.e., a single-sided, magnetically-induced, super-resolution (MSR)-type, first surface configured magneto-optical (FSMO) medium 50. Formed on a first one (51A) of the opposing major surfaces of substrate 51 is a layer stack, comprising, in overlying sequence from substrate surface 51A: (a) a reflective, heat sinking layer 52 about 300–500 Å thick, typically comprising Al or an alloy thereof, e.g., AlCr, AlTi, AlCu, AlMo, etc.; (b) a first dielectric material layer 53 about 100–400 Å thick and substantially transparent to the wavelength(s) of the at least one laser beam employed for writing and reading out information, typically selected from SiN$_x$ (where x=ca. 0.8–1.33), AlN$_x$ (where x=ca. 1–1.5), SiO$_x$ (where x=ca. 1–2.0), and AlO$_x$ (where x=1–1.5); (c) an MO auxiliary, writing assist layer 54 comprising an RE-TM material about 50–100 Å thick, typically selected from TbFe, TbFeCo, and FeCoX, where X is Dy, Gd, or Sm; (d) an MO writing layer 55 comprising an RE-TM material about 200–300 Å thick and having perpendicular anisotropy, large perpendicular coercivity, and high Curie temperature, typically selected from TbFe, TbFeCo, TbDyFeCo, and TbFeCoX, TbDyFeCoX, DyFeCoX, where X is Al, Y, or Nd; (e) in the case of exchange coupling type MSR media, an exchange coupling layer 56 comprising an RE-TM material about 10–50 Å thick, in contact with MO writing layer 55 for increasing the recording density of the latter by replicating the magnetic orientation thereof by exchange coupling and increasing the coupling force between MO writing layer 56 and a spaced-apart MO read-out layer 58, typically comprising GdFeCo; or (f) in the case of magneto-static coupling type MO media, a second dielectric material layer 57 about 5–50 Å thick and substantially transparent to the wavelength(s) of the at least one laser beam employed for writing and reading out information, typically selected from SiN$_x$, AlN$_x$, SiO$_x$, and AlO$_x$, where x in each instance is as given above for layer 53, for performing magneto-static coupling between the MO writing layer 55 and an MO read-out layer (58); (g) an MO read-out layer 58 comprising an RE-TM material about 200–400 Å thick and having a small coercivity and low Curie temperature, typically selected from GdFeCo, and GdFeCoX, where X is Al, Nd, or Y, and GdFeCoXX', where X is Al, Nd, or Y, and X' is Cr, Ta, or Nb; (h) a third dielectric material layer 59 about 800–1,200 Å thick for a red laser and about 400–500 Å thick for a blue laser, and substantially transparent to the wavelength(s) of the at least one laser beam employed for writing and reading-out information, typically selected from $SiN_x$, $AlN_x$, $SiO_x$, and $AlO_x$, where x in each instance is as given above for layer 53; (i) a thin, protective flash overcoat layer (FLO) 60 comprising an abrasion-resistant, carbon-based material about not greater than about 10 Å thick, e.g., from about 5 to about 10 Å thick, selected from ion-beam deposited carbon, plasma-enhanced chemical vapor deposition (PECVD) carbon, $a\text{-}CN_x$ (where x=0.03–0.10), $a\text{-}CH_x$ (where x=0.20–0.30), and $a\text{-}CN_xH_y$ (where x=0.03–0.10 and y=0.15–0.30); and (j) a lubricant topcoat layer 61 having a thickness less than about 25 Å, e.g., from about 5 to less than about 25 Å thick, comprised of a fluoro-polyether or perfluoro-polyether polymer compound, e.g., perfluoro-polyethylene (PFPE).

As with the NFR- or LGMO-type, FSMO-configured embodiment described supra, a dual-sided MSR-type, FSMO-configured embodiment corresponding to that shown in FIG. 4 and described above, may be formed by depositing an identically constituted layer stack on substrate surface 51B opposing surface 51A (not illustrated herein for brevity). As before, such dual-sided media may be advantageously operated to record and read-out information from both sides of a common substrate (e.g., 51), and thus are useful for increasing storage density. It is also noted that each of the layers constituting the layer stacks of the different MSR-type embodiments (i.e., the magneto exchange coupling type and the magneto-static coupling type) may be deposited by the same or similar methods utilized for forming the various layers of the NFR-type embodiments.

Thus, the present invention advantageously provides high quality, tribologically robust, ultra-high recording density, NFR- (or LGMO-) and MSR-type FSMO-configured magneto-optical information and data storage and retrieval media comprising substrate surface(s) which have received a two-step, synergistic, tape burnishing/wiping+photolytic treatment prior to MO laminate deposition thereon and a thin, abrasion-resistant, carbon-based, flash layer protective overcoat (FLO)/lubricant topcoat layer system, which provide very low head flying (or glide) heights suitable for use in very high density information storage and retrieval systems and devices operating at very low, or minimal, head fly heights of less than about 2 μin., e.g., less than about 1 μin.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of manufacturing a low glide height, high recording density, magneto-optical data/information storage and retrieval medium, comprising the sequential steps of:

(a) providing a substrate comprising at least one deposition surface;

(b) mechanically polishing said at least one deposition surface to reduce the asperity thereof; and (c) photolytically treating the polished at least one deposition surface to remove contaminants and debris therefrom, comprising treating the polished at least one deposition surface in an ozone ($O_3$)-containing atmosphere while exposing said ozone-containing atmosphere to UV radiation.

2. The method according to claim 1, wherein:

step (a) comprises providing a substrate comprising a material selected from the group consisting of: glass, metal alloys, aluminum (Al), Al alloys, NiP-coated Al, polymers, ceramics, glass-ceramics composites, and glass-polymer composites.

3. The method according to claim 2, wherein:

step (a) comprises providing a disk-shaped substrate having a pair of opposed major deposition surfaces.

4. The method according to claim 1, wherein:

step (b) comprises performing a tape burnishing process.

5. The method according to claim 4, wherein said tape burnishing process of step (b) comprises a first step of buffing said at least one deposition surface with a moving tape having a surface coated with finely-dimensioned abrasive particles, followed by a second step of wiping the polished at least one substrate surface with a moving tape having a non-abrasive surface.

6. The method according to claim 1, further comprising contacting the polished at least one deposition surface with an inert gas atmosphere subsequent to said photolytic treatment.

7. The method according to claim 1, further comprising the step of:

(d) depositing a stacked plurality of layers comprising at least one magneto-optical (MO) layer on the polished at least one deposition surface of said substrate.

8. The method according to claim 7, wherein said MO medium is configured as a near field recording, first surface magneto-optical (NFR-FSMO)-type medium and a said stacked plurality of layers (i)–(vii) deposited in step (d) comprises, in sequence from the polished at least one deposition surface of said substrate:

(i) a heat sinking and reflective layer;

(ii) a first dielectric layer comprising a material which is substantially transparent to the wavelength(s) of at least one laser beam used for writing and reading-out information stored in said medium;

(iii) an MO auxiliary, writing assist layer comprising a rare earth/transition metal (RE-TM) material;

(iv) an MO read-write layer comprising an RE-TM thermo-magnetic material having perpendicular anisotropy, large perpendicular coercivity, and high Curie temperature;

(v) a second dielectric layer comprising a material which is substantially transparent to the wavelength(s) of the at least one laser beam used for writing and reading-out information stored in said medium;

(vi) a thin, abrasion-resistant, protective flash layer overcoat (FLO) over said second dielectric layer, said FLO being substantially transparent to the wavelength(s) of the at least one laser beam used for writing and reading-out information stored in said medium; and (vii) a thin lubricant topcoat layer over said FLO.

9. The method according to claim 8, wherein:

said heat sinking and reflective layer (i) comprises aluminum (Al) or an alloy thereof;

each of said first and second substantially transparent dielectric layers (ii) and (v) comprises a material selected from the group consisting of: $SiN_x$, $AlN_x$, $SiO_x$, and $AlO_x$;

said MO auxiliary, writing assist layer (iii) comprises an RE-TM material selected from the group consisting of: TbFe, TbFeCo, and FeCoX, where X is Dy, Gd, or Sm;

said MO read-write layer (iv) comprises an RE-TM material selected from the group consisting of: TbFe, TbFeCo, TbDyFeCo, and TbFeCoX, TbDyFeCoX, and DyFeCoX, where X is Al, Y, or Nd;

said thin, protective FLO (vi) comprises a carbon-based material selected from the group consisting of: ion beam-deposited carbon, plasma-enhanced chemical vapor deposition (PECVD) carbon, $a\text{-}CN_x$, $a\text{-}CH_y$, and $a\text{-}CN_xH_y$; and said thin, lubricant topcoat layer (vii) comprises a fluoropolyether or perfluoropolyether (PFPE) lubricant material.

10. The method according to claim 9, wherein:

step (a) comprises providing a substrate including a pair of opposed major deposition surfaces;

steps (b) and (c) are performed on each of said pair of major deposition surfaces; and step (d) comprises forming a said stacked plurality of layers (i)–(vii) on each of said pair of opposed major deposition surfaces.

11. The method according to claim 7, wherein said MO medium is configured as a magnetic super-resolution-first surface magneto-optical (MSR-FSMO)-type medium and a said stacked plurality of layers (i)–(x) deposited in step (d) comprises, in sequence from the polished at least one deposition surface of said substrate:

(i) a heat sinking and reflective layer;

(ii) a first dielectric layer comprising a material which is substantially transparent to the wavelengths of at least one laser beam used for writing and reading-out information stored in said medium;

(iii) an MO auxiliary, writing assist layer comprising a rare earth/transition metal (RE-TM) material;

(iv) an MO writing layer comprising an RE-TM thermo-magnetic material having perpendicular anisotropy, large perpendicular coercivity, and high Curie temperature;

(v) an exchange coupling layer comprising an RE-TM material in contact with the MO writing layer for increasing the recording density of said MO writing layer by replicating the magnetic orientation thereof by exchange coupling and increasing the coupling force between the MO writing layer and a spaced-apart MO read-out layer; or (vi) a second dielectric material which is substantially transparent to the wavelength(s) of at least one laser beam used for writing and reading-out information stored in said medium and performs magneto-static coupling between the MO writing layer and a spaced-apart MO read-out layer;

(vii) an MO read-out layer comprising an RE-TM material having a small coercivity and low Curie temperature;

(viii) a third dielectric layer comprising a material which is substantially transparent to the wavelength(s) of the at least one laser beam used for writing and reading-out information stored in said medium;

(ix) a thin, abrasion-resistant, protective flash layer overcoat (FLO) over said third dielectric layer, said FLO being substantially transparent to the wavelength(s) of the at least one laser beam used for writing and reading-out information stored in said medium; and (x) a thin lubricant topcoat layer over said protective FLO.

12. The method according to claim 11, wherein:

said heat sinking and reflective layer (i) comprises aluminum (Al) or an alloy thereof;

each of said first, second, and third substantially transparent dielectric layers (ii), (vi), and (viii) comprises a material selected from the group consisting of: $SiN_x$, AlN, $SiO_x$, and $AlO_x$;

said MO auxiliary, writing assist layer (iii) comprises an RE-TM material selected from the group consisting of: TbFe, TbFeCo, and FeCoX, where X is Dy, Gd, or Sm;

said MO writing layer (iv) comprises an RE-TM material selected from the group consisting of: TbFe, TbFeCo, TbDyFeCo, and TbFeCoX, TbDyFeCoX, and DyFeCoX, where X is Al, Y, or Nd;

said exchange coupling layer (v) comprises an RE-TM material comprising GdFeCo;

said MO read-out-layer (vii) comprises an RE-TM material selected from the group consisting of: GdFeCo and GdFeCoX, where X is Al, Nd, or Y, and GdFeCoXX', where X is Al, Nd, or Y and X' is Cr, Ta, or Nb;

said thin, protective FLO (ix) comprises a carbon-based material selected from the group consisting of: ion beam-deposited carbon, plasma-enhanced chemical vapor deposition (PECVD) carbon, $a\text{-}CN_x$, $a\text{-}CH_y$, and $a\text{-}CN_xH_y$; and said thin, lubricant topcoat layer (x) comprises a fluoropolyether or perfluoropolyether (PFPE) material.

13. The method according to claim 12, wherein:

step (a) comprises providing a substrate including a pair of opposed major deposition surfaces;

steps (b) and (c) are performed on each of said pair of major surfaces; and step (d) comprises forming a said stacked plurality of layers (i)–(x) on each of said pair of opposed major deposition surfaces.

* * * * *